United States Patent
Konetzka et al.

(10) Patent No.: US 7,863,788 B2
(45) Date of Patent: Jan. 4, 2011

(54) SYSTEM CONCEPT FOR MILLS AND CLASSIFIERS WITH MAGNETIC BEARING SPINDLE DRIVES

(75) Inventors: Georg Konetzka, Augsburg (DE); Karsten Ludewig, Stadtbergen (DE); Jürgen Stahl, Horgau-Auerbach (DE)

(73) Assignee: Hosokawa Alpine Aktiengesellschaft, Augsburg (DE)

( * ) Notice: Subject to any disclaimer, the term of this patent is extended or adjusted under 35 U.S.C. 154(b) by 460 days.

(21) Appl. No.: 11/744,490

(22) Filed: May 4, 2007

(65) Prior Publication Data

US 2007/0257573 A1 Nov. 8, 2007

(30) Foreign Application Priority Data

| | | |
|---|---|---|
| May 6, 2006 | (DE) | 10 2006 021 195 |
| May 6, 2006 | (DE) | 10 2006 021 196 |
| May 6, 2006 | (DE) | 10 2006 021 197 |

(51) Int. Cl.
*B02C 23/00* (2006.01)
*B08B 3/00* (2006.01)

(52) U.S. Cl. ............ 310/86; 310/87; 310/88; 310/90.5; 241/101.2; 241/188.2; 241/285.1

(58) Field of Classification Search .......... 310/85, 310/86, 87, 88, 90.5; 241/101.2, 188.2, 285.1
See application file for complete search history.

(56) References Cited

U.S. PATENT DOCUMENTS

| | | | | |
|---|---|---|---|---|
| 4,295,803 | A * | 10/1981 | Barthelmess | 417/423.12 |
| 5,310,311 | A | 5/1994 | Andres et al. | 415/229 |
| 5,947,394 | A | 9/1999 | Egan, III et al. | 241/30 |
| 6,745,767 | B2 | 6/2004 | Kullik et al. | 128/204.19 |
| 6,905,085 | B2 | 6/2005 | Nara et al. | 241/101.2 |
| 2007/0257573 | A1 * | 11/2007 | Konetzka et al. | 310/90 |

FOREIGN PATENT DOCUMENTS

| | | |
|---|---|---|
| DE | 000004334662 A1 | 4/1994 |
| DE | 000004342583 A1 | 6/1995 |
| DE | 000019542079 A1 | 6/1996 |
| DE | 000019637270 A1 | 3/1998 |
| DE | 000010007428 A1 | 6/2001 |
| DE | 000010032913 C2 | 1/2002 |
| DE | 20 2005 011 349 U1 | 1/2006 |
| DE | 102004042269 A1 | 3/2006 |

(Continued)

OTHER PUBLICATIONS

Search Report from corresponding European application No. EP 07008640.0 dated Dec. 13, 2007.

*Primary Examiner*—Quyen Leung
*Assistant Examiner*—David W. Scheuermann
(74) *Attorney, Agent, or Firm*—Winston & Strawn LLP

(57) ABSTRACT

A system for process-technological machines such as mills and classifiers having an enclosed design with no rotary unions between the ambient air and system interior. This system is particularly useful for CIP and SIP operation modes or glove-box operations. The mills or classifiers include an encapsulation that seals the components of the magnetic bearing spindle drive against the working zone of the shaft in the magnetic bearing spindle housing. The magnetic bearing spindle drive is designed such that the shaft can be removed to facilitate simpler and easier component exchange as well as thorough cleaning.

19 Claims, 5 Drawing Sheets

FOREIGN PATENT DOCUMENTS

| | | |
|---|---|---|
| EP | 1 155 750 A1 | 11/2001 |
| EP | 1 300 195 A1 | 4/2003 |
| GB | 2 022 703 A | 12/1979 |
| JP | 2000120580 A | 4/2000 |
| JP | 2003174742 A | 6/2003 |
| JP | 2003329037 A | 11/2003 |
| WO | WO 99/19070 | 4/1999 |

* cited by examiner

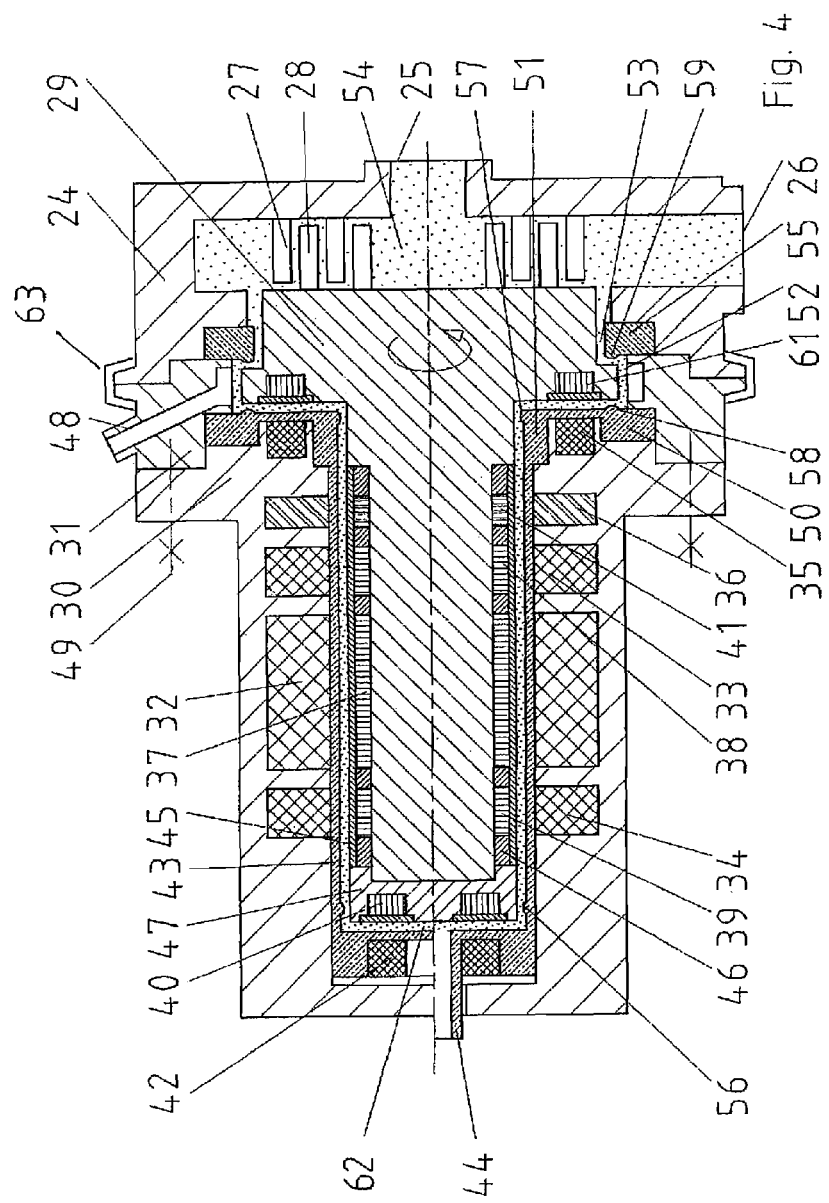

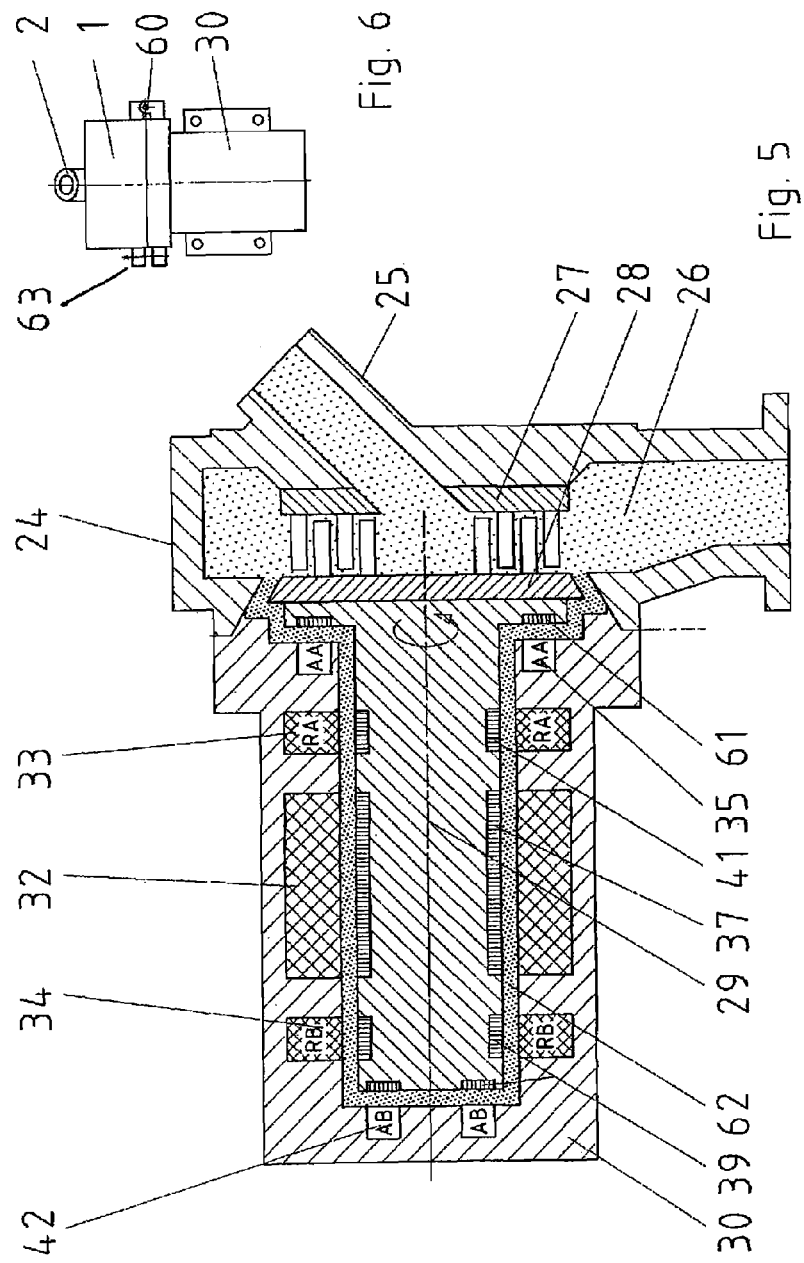

SYSTEM CONCEPT FOR MILLS AND CLASSIFIERS WITH MAGNETIC BEARING SPINDLE DRIVES

BACKGROUND

The invention concerns a system concept for process-technological machines in enclosed design with no rotary unions between the ambient air and the inside of the system. Machines which are correspondingly encapsulated—especially mills and classifiers with magnetic bearing spindle drives—are used hereby. The magnetic bearing spindle drive is designed such that the magnetic bearing spindle shaft can be removed without having to dismantle the magnetic bearing spindle housing, thus facilitating simpler and easier component exchange as well as thorough cleaning.

U.S. Pat. No. 6,905,085 (and EP 1,300,195 A1) describes a powder processing system which is operated inside a glove box. The working zones and the rotating components of the machine are located inside the glove box whereas the machine bearings and drives are located on the outside. The machine shafts extend from outside the glove box via rotary unions into the working zone of the machines where they accommodate the respective rotating components. To prevent material ingress from the working zone into the bearings or the ambient air or vice versa, the shafts are sealed by means of two rinsing gaps, whereby one separates the working zone from the intermediate zone, and the other separates the intermediate zone from the outside.

Machines with magnetic bearings or magnetic bearing spindle drive are known. A refiner with a corresponding drive is described in U.S. Pat. No. 5,947,394 (and WO 99/19070 A1). The refiner features a rotor consisting of a shaft with refiner elements plus complementary stator elements, which together with the rotating elements form a gap in which a slurry is treated. The shaft of the rotor is supported in magnetic bearings which simultaneously define the axial and radial position of the shaft. The shaft has a disc-shaped extension designed to support and position the shaft in axial direction. Axial magnetic bearings are located upstream and downstream of this extension. Besides shaft positioning in axial direction, an adjustment of the grinding gap is also facilitated.

SUMMARY OF THE INVENTION

The invention is directed to a system comprising process technological machines such as grinding mills or classifiers which meet all the requirements for operation in a clean room, a glove box, in sterilize-in-place (SIP) or clean-in-place (CIP) modes and combinations thereof. These machines have no rotary unions between the product zone and the ambient air. The invention also provides a process-technological machine with a magnetic bearing spindle drive where the penetration of contaminants into the working zone as well as leakage of the product out of the working zone is prevented.

These features are achieved in a system having at least one mill or classifier that includes a rotating component in a working zone, a bearing unit and drive, and a common encapsulation shell that seals the system, wherein the shell has no rotary unions and the rotating component is supported and driven by a magnetic bearing spindle.

The magnetic bearing spindle drive preferably includes a magnetic bearing spindle housing, a magnetic bearing spindle shaft, a gap between the housing and shaft, and a gap element that hermetically seals the housing from the working zone of the magnetic bearing spindle shaft. Typically, the shell hermetically seals the shaft against the gap between the shaft and housing.

The gap element may be configured as a container with a collar, and can exhibit elevations which are designed as emergency bearing surfaces. Alternatively, the housing includes a counter ring that can exhibit elevations which are designed as emergency bearing surfaces.

The shell may include connections for introducing rinsing, cleaning or sterilization media. When so equipped, the gap element is further equipped with a central connection for the supply and discharge of the rinsing cleaning or sterilization agent. The gap is generally formed between an inside contour of the housing and an outside contour of shaft, and the gap is preferably separated from the working zone of the rotating component by a rinsing agent for smooth operation.

The system preferably includes a hinged locking mechanism for the housing and shell. Thus, upon release of the locking mechanism, the housing can be moved to provide access to the shaft without having to dismantle the housing.

BRIEF DESCRIPTION OF THE DRAWINGS

Other specific features and advantages of the invention can be found in the following description of a preferred embodiment using the figures as a basis, wherein:

FIG. 4 shows the encapsulation of a pin mill with magnetic bearing spindle drive in longitudinal section;

FIG. 5 shows a pin mill with magnetic bearing spindle drive in longitudinal section; and FIG. 6 is a top view of the mill of FIG. 5

DETAILED DESCRIPTION OF THE PREFERRED EMBODIMENTS

Figure 1:
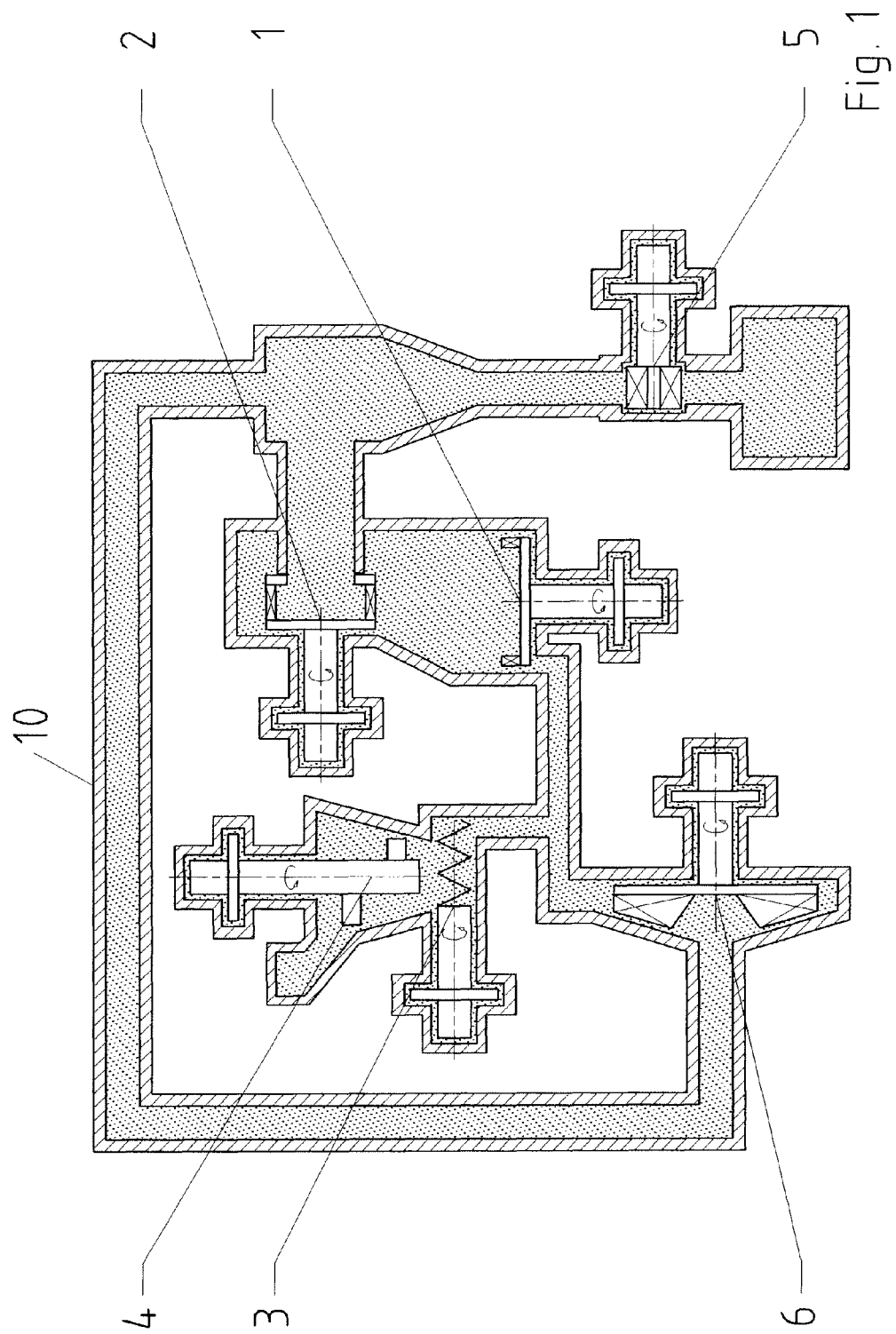
FIG. 1 is a schematic representation of a grinding-classifying system.

High demands are made of systems that are operated in the pharmaceutical industry. Product contamination from the outside and by system components must be minimized or prevented. Over and above this, users and system operators must be protected from contact with the highly active substances being processed in the best possible way. Residue-free cleaning of the system must be possible, and the system—especially the machines—must be suitable for SIP and CIP mode.

With the present system, these advantages are achieved by choosing a drive that requires no rotary unions leading to the outside of the system. Such a system can be used in process-technological machines having different functions, such as mills or classifiers. As a rule, the encapsulation that seals the system to the outside comprises a machine housing, a housing to accommodate the rotating components, equipment with no rotating parts, bins, ductings and connecting elements that have static seals. The system is thus sealed not only against the ambient air, but also against the components such as bearings and drives. Material and product are supplied to and removed from the system by means of transfer ports.

In the case of the present invention and in contrast to the known machines, the inside wall of the magnetic bearing spindle housing is lined and the magnetic bearing spindle shaft is encapsulated. This serves to seal the components of the magnetic bearing spindle drive located below the lining or encapsulation against the working zone of the shaft in the magnetic bearing spindle housing. In the pharmaceutical industry, pharma-compatible polymers or stainless steel are the materials of choice for this purpose. The lining of the magnetic bearing spindle housing comprises a gap element which seals the bearing and motor components off against the working zone of the shaft. The components on the other side of the shaft are sealed off against the working zone by means of encapsulation. The gap element thus also seals the product-contact zone against the ambient air. This inventive device thus features no rotary union between the outside of the machine and the product-contact zone through which, for example, product could leak out of the mill. In another variant, the gap is separated from the working zone of the mill by means of gap rinsing. This has the task of preventing product from penetrating into the gap.

The invention-design process-technological machines such as mills or classifiers are characterized in that the product-contact areas with the rotating component such as classifying wheel or grinding disc are accessible once the machine housing is opened. The magnetic bearing spindle shaft and the rotating component form a unified whole. The magnetic bearing is in tapered design, whereby the widest diameter is on the side of the rotating component. The radial bearing and the motor are arranged concentrically in relation to the shaft in the housing. All components and counterparts are annular in design. The counterparts of the bearing and motor on the magnetic bearing spindle shaft are located in the effective magnetic range of the motor and bearings. This design makes it possible to pull the magnetic bearing spindle shaft out of the bearing housing together with the rotating component. The shaft and rotating component can now be cleaned outside the machine. The product contact areas of the working zone can also be cleaned thoroughly without the rotating component getting in the way and without product remaining between the rotating component and the wall of the working zone. The entire rotor comprising shaft and rotating component can be exchanged as one unit, thus minimizing maintenance time.

FIG. 1 shows a schematic of a typical grinding-classifying system comprising mill (1), dynamic classifier (2), mixer (4), rotary valve (5), fan (6), feed metering screw (3) with a feed bin sealed to the outside and a sealed end-product bin for batch processing. The system components are encapsulated to seal them off to the outside. The system can, for example, be installed in a glove box that is not shown here.

Encapsulated magnetic bearing spindle drives are used to drive the units. The drives have no rotary unions for individual machine elements such as shafts. This makes it possible to do without expensive bearing rinsing systems between the drives located outside the clean room and the machine components inside to prevent the exchange of product and/or contaminants between the ambient air and the product zone.

Figure 2:
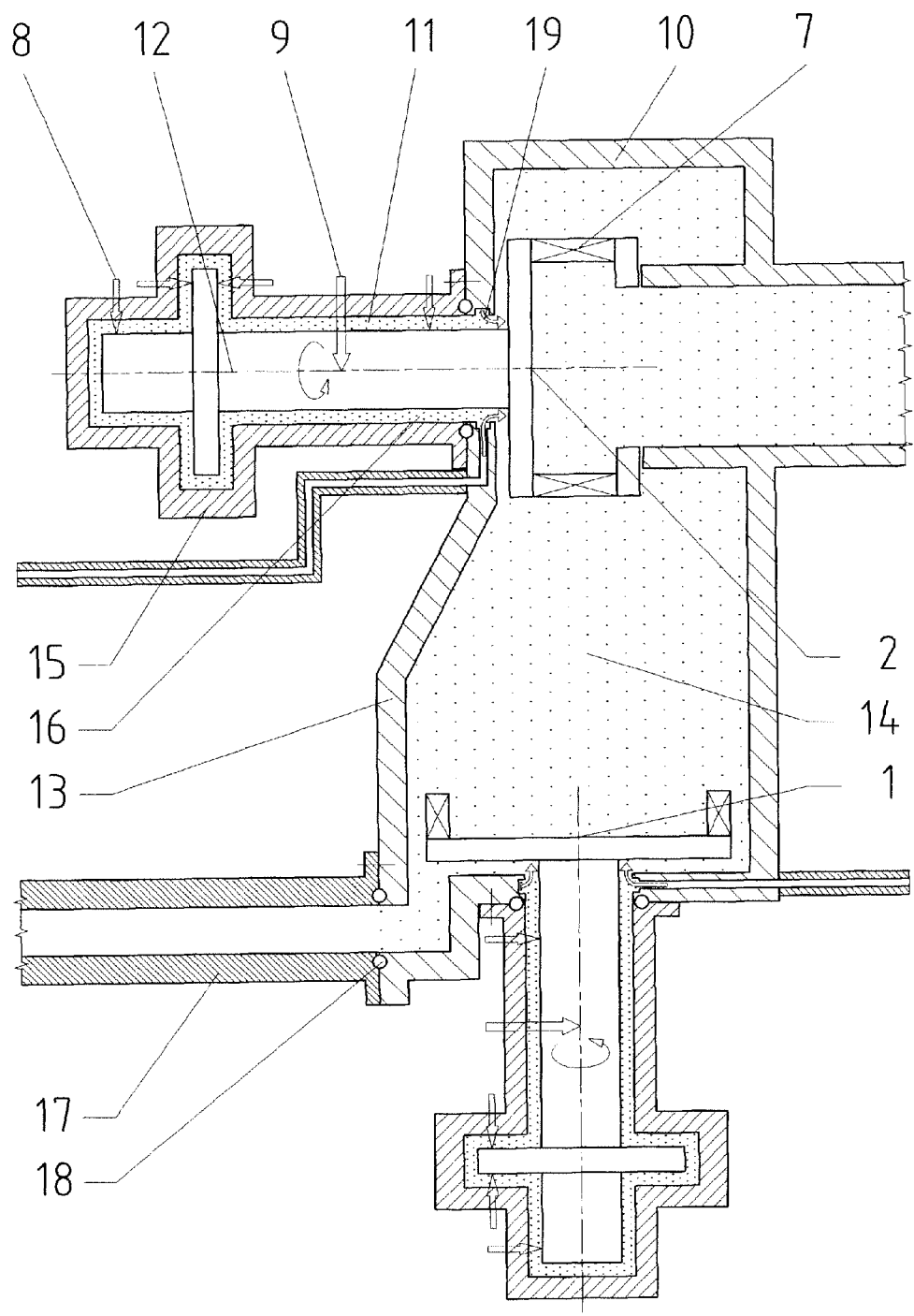
FIG. 2 is a detail of FIG. 1.

FIG. 2 shows a detail of the system shown in FIG. 1. A magnetic bearing spindle drive supplies the energy necessary to stabilize the bearings, as indicated by arrow (8) and rotate the components (7), as indicated in reference to arrow (9), of the process-technological machines, which as a result of the common encapsulation (10) sealed to the outside and the gap (11), is routed to the energy-absorbing parts of the components, indicated by (12). The common encapsulation (10) sealed to the outside generally consists of the machine housing (13), which forms the product-contact working zone (14), the housing (15) to accommodate the rotating components which together with the energy-absorbing part of the component delimits the gap area, units with no rotating parts, bins, connecting ductings (17) and connecting elements with static seals (18). For continuous operation, product and working media can be supplied to and removed from the system via transfer ports.

Figure 3:
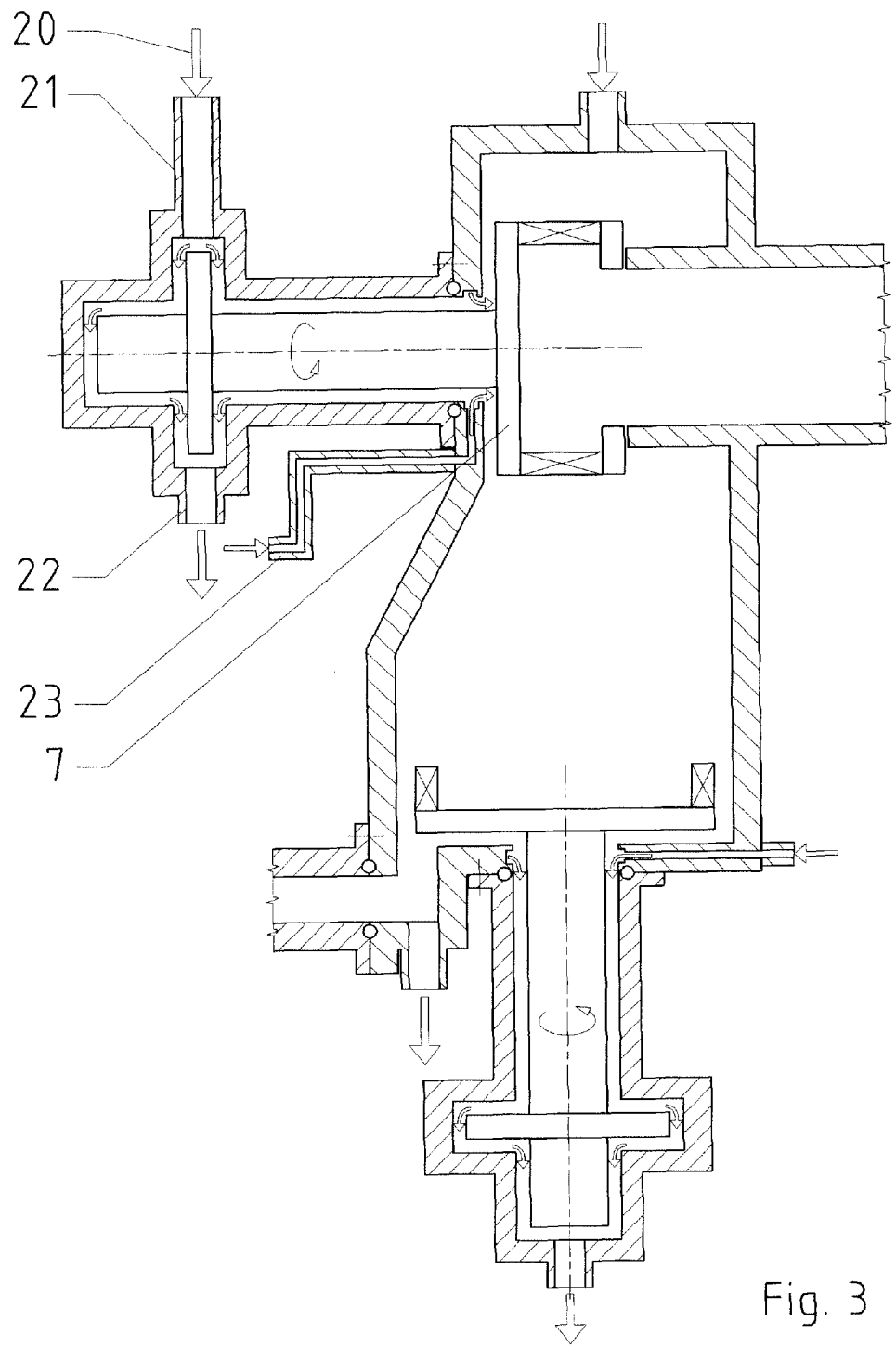
FIG. 3 is another detail from FIG. 1 with rinsing lines for CIP and SIP mode of operation.

The detail of the system from FIG. 1 shown in FIG. 3 represents the system in a design suitable for CIP and SIP mode. Ductings (21) for the supply of cleaning and sterilization agents (20) are fitted at the highest point of the housing, whereas the drainage ductings (22) are fitted at the lowest point of the unit. In SIP and CIP mode, the rinsing lines (23) can be integrated into the cleaning, sterilization and drying process. A state of suspension or slow rotation of the components (7) assists the process.

FIG. 4 shows a pin mill equipped with a magnetic bearing spindle drive. The mill consists of a mill housing (24) with intake (25) and product discharge (26) that accommodates the static pin disc (27). The dynamic pin disc (28) is accommodated by the magnetic bearing spindle shaft (29). The mill housing (24) and magnetic bearing spindle drive are connected with each other to swivel by means of a connecting element.

The magnetic bearing spindle drive comprises the magnetic bearing spindle housing (30) with intermediate ring (31), which accommodates the motor (32), radial bearing with position measuring system A (33), radial bearing with position measuring system B (34), axial bearing A (35) with axial position measuring system (36) as well as a magnetic bearing spindle shaft (29). The counterparts of the motor (37), bearings (38, 39, 40, 61) and position measuring systems (41) are located on the magnetic bearing spindle shaft (29). The shaft (29) accommodates the rotating component, in this case the dynamic pin disc (28). The magnetic bearing spindle shaft (29) is located in the magnetic bearing spindle housing (30) at the center of the above described components. The counterparts (38, 37, 39) of the motor and bearings on the magnetic bearing spindle shaft (29) are located in the effective magnetic range of the motor (32), radial bearings (33, 34) and axial bearings (35, 42).

Together with the outside contour of the magnetic bearing spindle shaft (29), the inside contour of the magnetic bearing spindle housing (30) forms the gap area (62), i.e. the working zone of the shaft. The shaft rotates within the magnetic bearing spindle housing without physical contact and is wear-free in operation.

A gap element (43) is fitted in the magnetic bearing spindle housing (30). The preferred design of the gap element (43) is in the form of a container with collar made of a pharmaqualified polymer. It seals the motor (32) and bearings (33, 34, 35, 42) and the position measuring system (36) located in the magnetic bearing spindle housing (30) against the working zone of the magnetic bearing spindle shaft (29). A variant of the gap element (43) has a connection (44) at the bottom through which cleaning and/or rinsing media can be supplied and drained off.

The tubular encapsulation (45) of the magnetic bearing spindle shaft (29) which is designed to taper in a staged or conical manner is press-fitted to enclose the spacer rings (46) and the counterparts (38, 37, 39, 41), and has a permanent connection with the edge of the shaft shoulder and the end cap (47). The encapsulation (45) is preferably made of stainless steel.

An intermediate ring (31) with rinsing medium feed point (48) is linked to the magnetic bearing spindle housing (30) by means of connecting elements (49) and fixes the axial and radial position of the gap element (43). The fixing point of the gap element (43) is in the form of an enlargement (50) which acts as a seal and as a reinforcement. The other enlargement (51) also acts as a reinforcement. Rinsing air can be routed into the axial gap (52, 53) via the rinsing medium feed point (48); this prevents the ingress of product from the product-contact zone (54) into the working zone of the magnetic bearing spindle shaft and vice versa.

The counter ring (55) in relation to the collar (50) of the gap element (43) is centered in the mill housing (24) and together with the rinsing gap (53), acts as a seal against the product-contact zone (54) of the mill. The gap element (43) exhibits elevations (56 and 57) in radial direction. The magnetic bearing spindle shaft (29) rests on these elevations when the magnetic bearing spindle drive is inactive. The elevations (56, 58, 57, 59) are dimensioned such that in the event of damage, their effective surfaces serve as contact points, i.e. they constitute emergency bearing surfaces.

FIG. 5 shows a pin mill as an example for a process-technological machine which is equipped with a magnetic bearing spindle drive. The mill comprises a mill housing accommodates the static pin disc (27), which interacts with the dynamic pin disc (28) on the magnetic bearing spindle shaft (29).

The magnetic bearing spindle drive consists of a magnetic bearing spindle housing (30) and a magnetic bearing spindle shaft (29). The magnetic bearing spindle shaft (29) is centered in the magnetic bearing spindle housing (30). The magnetic bearing spindle shaft (29) accommodates the dynamic pin disc (28) which is centered at one end. The shaft (29) is designed to taper in stages, this makes it possible to pull the shaft out of the magnetic bearing spindle housing (30) without having to dismantle the magnetic bearing spindle housing (30) or remove the rotating component (28) from the shaft (29).

FIG. 6 shows a top view of the mill. The magnetic bearing spindle housing (30) and the mill housing (24) are connected to each other by means of an external shaft (60). Once the locking mechanism (63) is opened, the mill housing (24) can be hinged off to the side, thus permitting access to the shaft (29) with the rotating component (28). The tapered magnetic bearing spindle shaft (29) can now be removed from the magnetic bearing spindle housing together with the rotating component (28). The mill housing (24) can be cleaned easily and thoroughly. The rotating component (28) can be removed from the shaft (29) and cleaned or exchanged. The shaft (29) and rotating component (28) can also be manufactured in one piece.

The invention is not restricted to the design shown in the drawings and described in detail in the preceding text and is covered by the true spirit and scope of the appended claims.

What is claimed is:

1. A system having at least one mill or classifier that includes a rotating component in a working zone, a bearing unit and drive, and a common encapsulation shell that seals the system, wherein the shell has no rotary unions and the rotating component is supported and driven by a central magnetic bearing spindle having a shaft and a housing, wherein the rotating component is centered at one end of the shaft and forms an assembly with the shaft of the central magnetic bearing spindle, with the shaft being freely rotatable and configured to allow for removal of the shaft and rotating component without first removing the housing.

2. The system of claim 1, wherein the shell includes connections for introducing rinsing, cleaning or sterilization media.

3. The system of claim 1, wherein the magnetic bearing spindle drive includes a magnetic bearing spindle housing, a central magnetic bearing spindle shaft, wherein the central magnetic bearing spindle shaft is tapered, a gap between the housing and shaft, and a gap element that hermetically seals the housing from the working zone of the rotating component.

4. The system of claim 3, wherein the shell hermetically seals the shaft against the gap between the shaft and housing.

5. The system of claim 3, wherein the gap element is configured as a container with a collar.

6. The system of claim 3, wherein the gap element exhibits elevations which are designed as emergency bearing surfaces.

7. The system of claim 1, wherein the housing includes a counter ring that exhibits elevations which are designed as emergency bearing surfaces.

8. The system of claim 3, wherein the shell includes connections for introducing rinsing, cleaning or sterilization media.

9. The system of claim 8, wherein the gap element is equipped with a central connection for the supply and discharge of the rinsing cleaning or sterilization agent.

10. The system of claim 3, which further comprises a locking mechanism for the housing and shell.

11. The system of claim 10, wherein, upon release of the locking mechanism, the housing can be moved to provide access to the shaft without having to dismantle the housing.

12. The system of claim 3, wherein the central magnetic bearing spindle shaft is cylindrical and solid, the gap is formed between an inside contour of the housing and an outside contour of the shaft, and the gap is separated from the working zone by a rinsing agent.

13. The system of claim 11, wherein the housing and shell are moved apart sufficiently to allow the shaft and rotating component to be removed without first removing the housing.

14. The system of claim 11, wherein the housing and shell are moved apart sufficiently to remove the rotating component from the shaft without first removing the housing.

15. The system of claim 8, wherein the gap is formed between an inside contour of the housing and an outside contour of shaft, and the gap is separated from the working zone by a rinsing agent.

16. The system of claim 1, wherein the rotating component is a milling disc or classifying wheel.

17. A system having at least one mill or classifier that includes a rotating component in a working zone, a bearing unit and drive, a common encapsulation shell that seals the system, and a locking mechanism for the housing and shell;
wherein the shell has no rotary unions, the rotating component is supported and driven by a central magnetic bearing spindle shaft, a gap between the housing and shaft, and a gap element that hermetically seals the housing from the working zone of the rotating component, wherein the shaft is tapered and the rotating component is centered at one end of the shaft; and
wherein, upon release of the locking mechanism, the housing can be moved with respect to the shell to provide access to the central magnetic bearing spindle shaft and the rotating component to provide access to the shaft without having to dismantle the housing, with the housing and shell being movable apart sufficiently to allow the shaft and rotating component to be removed therefrom and to remove the rotating component from the shaft without having to dismantle the housing.

18. The system of claim 1, wherein the magnetic bearing spindle shaft forms an integral assembly with the rotating component.

19. The system of claim 17, wherein the magnetic bearing spindle shaft forms an integral assembly with the rotating component.

* * * * *